US012673313B2

(12) United States Patent  
Singh

(10) Patent No.: US 12,673,313 B2  
(45) Date of Patent: Jul. 7, 2026

(54) METHOD AND APPARATUS FOR REGENERATING SORBENT FROM CARBON DIOXIDE ABSORPTION

(71) Applicant: SeaVar LLC, San Clemente, CA (US)

(72) Inventor: Uday Singh, San Clemente, CA (US)

(\*) Notice: Subject to any disclaimer, the term of this patent is extended or adjusted under 35 U.S.C. 154(b) by 1093 days.

(21) Appl. No.: 17/741,823

(22) Filed: May 11, 2022

(65) Prior Publication Data

US 2022/0379285 A1 Dec. 1, 2022

Related U.S. Application Data

(60) Provisional application No. 63/193,288, filed on May 26, 2021.

(51) Int. Cl.
| | |
|---|---|
| *B01D 53/02* | (2006.01) |
| *B01J 20/04* | (2006.01) |
| *B01J 20/34* | (2006.01) |

(52) U.S. Cl.  
CPC ......... *B01J 20/3483* (2013.01); *B01J 20/041* (2013.01)

(58) Field of Classification Search  
CPC ...... B01J 20/041; B01J 20/3483; Y02C 20/40  
See application file for complete search history.

(56) References Cited

U.S. PATENT DOCUMENTS

| | | | | |
|---|---|---|---|---|
| 3,865,924 A | * | 2/1975 | Gidaspow | ........... H01M 8/0662 |
| | | | | 423/232 |
| 4,376,101 A | * | 3/1983 | Sartori | ............... B01D 53/1493 |
| | | | | 423/232 |

(Continued)

FOREIGN PATENT DOCUMENTS

| | | | |
|---|---|---|---|
| CA | 2872440 | C | 11/2013 |
| CN | 101766947 | B | 10/2010 |

(Continued)

OTHER PUBLICATIONS

Removal and recovery of compressed CO2 from flue gas by a novel thermal swing chemisorption process—Lee—2008—AIChE Journal—Wiley Online Library.

*Primary Examiner* — Christopher P Jones

(74) *Attorney, Agent, or Firm* — Murthy Patent Law Inc.; Karthik Murthy

(57) ABSTRACT

A method for the regeneration of effluent from an absorber capturing emissions of carbon dioxide (CO2) from industrial sources. Reducing CO2 emissions from all sources is a key objective of most nations, and every industrial source of CO2 emissions has received extensive scrutiny. The method involves designing and installing on a source a proprietary thermal regeneration system for a sorbent used in the CO2 capture equipment system, which recirculates the sorbent liquid through an absorption column (absorber). Because sorbents used in these systems are expensive, it would be useful if the spent sorbent following absorption of CO2 is regenerated for re-use in the absorber. The present invention's regeneration method uses thermal swing (changes in temperature of the spent sorbent), and describes the integration of a waste heat recovery process into the thermal swing method. In particular, the method uses a heat transfer agent in a sealed loop circulating the heat transfer agent through a hot industrial source producing the CO2 stream.

5 Claims, 11 Drawing Sheets

(56) References Cited

U.S. PATENT DOCUMENTS

| | | | | | |
|---|---|---|---|---|---|
| 5,100,633 | A | * | 3/1992 | Morrison | C04B 7/60 |
| | | | | | 423/243.1 |
| 5,424,051 | A | * | 6/1995 | Nagji | B01D 53/261 |
| | | | | | 423/243.08 |
| 7,601,315 | B2 | | 10/2009 | Ouimet | |
| 7,820,591 | B2 | * | 10/2010 | Ryu | B01J 20/3021 |
| | | | | | 423/230 |
| 8,119,091 | B2 | | 2/2012 | Keith et al. | |
| 8,377,173 | B2 | | 2/2013 | Chuang | |
| 8,475,757 | B2 | | 7/2013 | Bublitz | |
| 8,486,356 | B2 | | 7/2013 | Attalla et al. | |
| 8,500,854 | B1 | | 8/2013 | Pennline et al. | |
| 8,741,244 | B2 | * | 6/2014 | Jones | C01D 7/07 |
| | | | | | 423/220 |
| 8,795,508 | B2 | * | 8/2014 | Jones | B01D 53/62 |
| | | | | | 423/165 |
| 9,205,375 | B2 | * | 12/2015 | Jones | B01D 53/75 |
| 9,266,057 | B1 | * | 2/2016 | Jones | B01D 53/1425 |
| 9,968,883 | B2 | * | 5/2018 | Yablonsky | B01D 53/526 |
| 2001/0022952 | A1 | * | 9/2001 | Rau | B01D 53/62 |
| | | | | | 422/600 |
| 2011/0286902 | A1 | * | 11/2011 | Fan | B01J 20/043 |
| | | | | | 422/619 |
| 2012/0304858 | A1 | * | 12/2012 | Wright | B01D 53/025 |
| | | | | | 96/108 |
| 2018/0022617 | A1 | * | 1/2018 | Cort | C01F 11/462 |
| | | | | | 423/146 |
| 2020/0016537 | A1 | | 1/2020 | Chen et al. | |

FOREIGN PATENT DOCUMENTS

| | | | |
|---|---|---|---|
| CN | 105903499 | B | 8/2016 |
| EP | 1940534 | B1 | 7/2008 |
| KR | 102231477 | B1 | 3/2021 |
| NZ | 581898 | A | 5/2012 |
| RU | 2461411 | C2 | 9/2012 |
| WO | 2021052432 | A1 | 3/2021 |

* cited by examiner

METHOD AND APPARATUS FOR REGENERATING SORBENT FROM CARBON DIOXIDE ABSORPTION

FIELD OF THE INVENTION

The present invention relates to the design, fabrication, and installation of a sealed, non-contact thermal loop to capture and use waste heat from combustion or other heat sources which produce carbon dioxide ($CO_2$) emissions. This heat is used in the temperature swing regeneration of the absorbent for $CO_2$ capture from spent effluent discharged from the absorbent used to capture the $CO_2$. The resulting increase in temperature of the spent absorbent releases $CO_2$ gas and results in the formation of a metal oxide, the hydration of which produces regenerated absorbent, which is returned to the absorption process. In a separate embodiment, the resulting increase in temperature of the spent absorbent releases $CO_2$ gas and results in the formation of an amine, which is returned to the absorption process.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties Such as concentration, reaction conditions, and so forth, used to describe and claim certain embodiments of the invention are to be understood as being modified in some instances by the term "about."

Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an and "the includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "Such as') provided with respect to certain embodiments herein is intended merely to better illuminate the invention and does not pose a limitation on the scope of the invention otherwise claimed.

No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any Such inclusion or deletion occurs, the specification is herein deemed to contain the group as modified thus fulfilling the written description of all Markush groups used in the appended claims.

Emissions of carbon dioxide, a major greenhouse gas (GHG), from various industrial sources (including but not limited to chemical, power generation, cement and other plants, and oil refineries) are projected to increase dramatically if effective mitigation measures are not quickly adopted. Some estimates suggest that climate change, a result of increased GHG, could reduce the world economy by $23 trillion by 2050. Furthermore, studies suggest 5.1 million people had already been displaced by climate change by the end of 2019.

With regard to attempting to reduce GHG, the European Union (EU) in particular has been proactive, and in April 2018 developed a GHG reduction strategy for member nations, including a goal of decreasing GHG emissions by at least 50% by 2050 compared to 2008 levels. More recently, the United States in 2021 has committed to a similar goal.

However, it's not clear if the technology exists to reach these goals in a cost-effective manner.

SUMMARY

The present invention solves these issues, because the present invention is able to both capture $CO_2$ and facilitate conversion of the captured $CO_2$ into a usable product. Furthermore, the present invention is able to do this at a far lower cost than other $CO_2$ capturing devices or processes. One reason for this is that typically reagents are very expensive, however, the present invention is able to regenerate reagents. Another reason is that the present invention does not need steam for reagent regeneration and subsequent re-use. Steam increases the cost of every ton of $CO_2$ captured, so by eliminating the need for steam, the present invention further reduces operating costs.

The present invention includes a method to use a chemical reagent to react with $CO_2$ in exhaust gases, wherein the $CO_2$ was produced from combustion or other processes in industrial plants. The reaction product is a soluble salt (bicarbonate and carbonate in the case of metal hydroxide reagents) or a spent organic chemical (in the case of amine reagents). As the exhaust gases pass through an absorber, the exhaust gases are in contact with a stream of liquid containing the chemical reagent. The $CO_2$ dissolves in the stream of liquid and chemically reacts with the chemical reagent.

This reaction removes a set amount of $CO_2$ from the exhaust gases, and then the remaining exhaust gases are released to the atmosphere from a plant stack.

The stream of liquid is recirculated through the absorber to absorb more $CO_2$, and a small portion of the stream of liquid that is effluent (the product) is diverted to a separate tank for processing in a separate dewatering and regeneration loop (in the case of metal hydroxide reagents), or stripper loop (in the case of amine reagents) to regenerate the chemical reagent for re-use in the absorber. In the process of regeneration, pure $CO_2$ gas is released, compressed, and stored in tanks for later sale.

The regeneration process is conducted in one or more thermal reactors, which are devices provided with a source of heat used to remove residual water and then decompose the bicarbonate and carbonate (if the chemical reagent used is a metal hydroxide) to the corresponding metal oxide. This metal oxide is discharged to a hydration tank, to which water is added to convert the metal oxide to the original hydroxide. This hydroxide is returned to an absorber loop to capture additional $CO_2$. Because these hydroxides are expensive, regeneration minimizes the need for supply of fresh hydroxide, resulting in a significant cost reduction. If the chemical reagent is an amine, the regeneration process is conducted in a stripper, which is a device provided with a source of heat (from the thermal reactor) and is used to strip $CO_2$ from the spent amine liquid effluent from the absorber. Because these amines are expensive, regeneration minimizes the need for supply of fresh amine, resulting in a significant cost reduction.

While steam at the appropriate pressure and temperature is a typical source of heat in such a regeneration process, it is also expensive. As such, the present invention utilizes a heat transfer agent in a sealed loop, wherein the heat transfer agent is circulated through a hot industrial source producing the $CO_2$ stream. The heat transfer agent is now at a high temperature, and so is used as a thermal source in a thermal reactor or stripper, eliminating the need for steam or other sources of heat for dewatering, decomposition, or stripping reactions.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Figure 1:
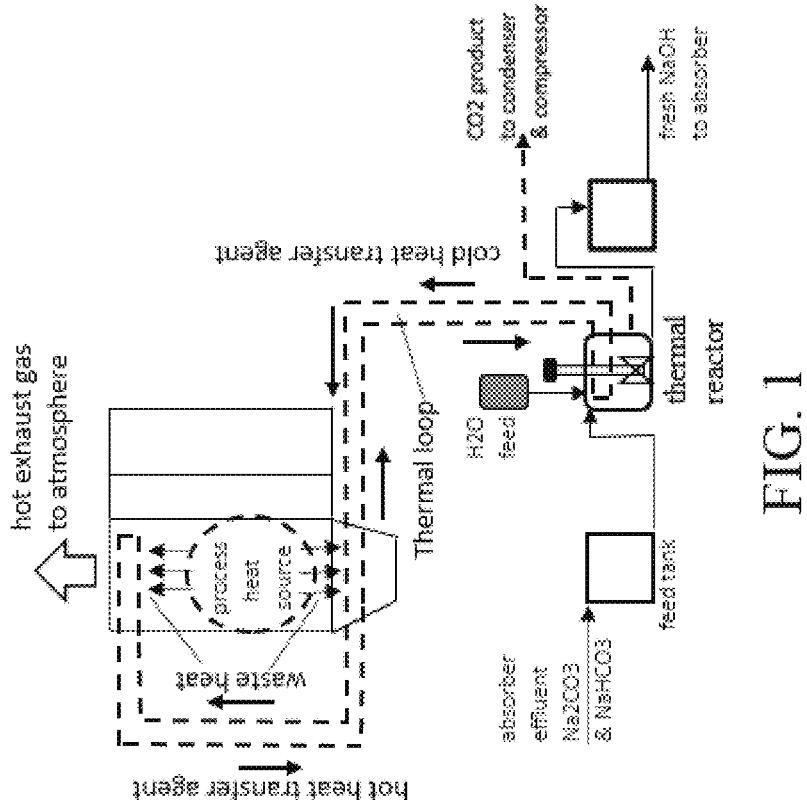
FIG. 1 is a drawing of a $CO_2$ absorption process used to capture $CO_2$ from the exhaust gases, and the regeneration process used to produce sorbent, according to various embodiments of the present disclosure.

Various embodiments of the present disclosure relate to providing a method and apparatus for the absorption of $CO_2$ produced by fuel combustion.

In one embodiment of the invention, the chemical reagent is sodium hydroxide (NaOH). The sodium hydroxide (NaOH) reacts with $CO_2$, where the $CO_2$ is from exhaust gases from combustion or other processes in industrial plants. The reaction product is a mixture of the soluble salt sodium carbonate ($Na_2CO_3$) and the less soluble salt sodium bicarbonate ($NaHCO_3$).

In another embodiment of the invention, the chemical reagent is potassium hydroxide (KOH). The potassium hydroxide (KOH) reacts with $CO_2$, where the $CO_2$ is from exhaust gases from combustion or other processes in industrial plants. The reaction product is a mixture of the soluble salt potassium carbonate ($K_2CO_3$) and the less soluble salt potassium bicarbonate ($KHCO_3$).

In both of the above embodiments, as the exhaust gases pass through a $CO_2$ capture absorber ("absorber"), the exhaust gases are in contact with a stream of liquid containing the chemical reagent. The $CO_2$ dissolves in the stream of liquid and chemically reacts with the chemical reagent, removing the desired amount of $CO_2$ from the exhaust gases. Afterwards, the remaining exhaust gases are released to the atmosphere from the plant stack.

Furthermore, a thermal loop recirculates a heat transfer agent through the industrial source producing $CO_2$, absorbing heat from the industrial source, and transferring the heat from the heat transfer agent to liquid effluent (containing water, metal carbonate and bicarbonate) from the absorber. The absorber includes:

1. Piping, tanks, and pumps to store and transfer spent liquid effluent from the absorber to a dewatering system
2. A dewatering system, including clarifiers, vacuum filters, hydro cyclones (known as hydroclones), centrifuges, and other devices for separating solids from liquids
3. A thermal reactor to perform chemical reactions in order to cause decomposition of the bicarbonates and carbonates (potentially sodium carbonate, sodium bicarbonate, potassium carbonate, potassium bicarbonate, or other metal carbonates and bicarbonates) to the corresponding oxides (potentially sodium hydroxide, potassium hydroxide, or other metal hydroxides)
4. A hydration system in which water is reacted with the oxides to produce the corresponding hydroxides
5. A system of pumps, piping, valves, and related components like fittings and flanges to circulate the heat transfer agent to the combustion or other heat source, and convey the heat transfer agent to the thermal reactor. In one embodiment, the piping is made of steel that is customized to handle temperatures over 1000 F. In another embodiment, the piping is made of steel that is customized to handle temperatures around 750 F.
6. Instrumentation to control, measure, and record process parameters in various areas of the dewatering and regeneration systems; Programmable Logic Controller (PLC), Human Machine Interface (HMI), and Supervisory Control and Data Acquisition (SCADA) devices to automatically control process parameters by using this instrumentation, record performance data, transmit selected data to a cloud-based storage device to allow remote monitoring and troubleshooting; and to enable a dedicated control panel in the host industrial plant to allow manual intervention of equipment in the event of a system problem. In another embodiment, the instrumentation to control, measure and record the dewatering and regeneration processes can be made through a combination of a processor, memory and data storage.

In another embodiment of the invention, the chemical reagent is an amine. The amine may be a primary amine (such as monoethanolamine), secondary amine (such as diethanolamine), or a tertiary amine (such as dimethylamine). The amine reacts with $CO_2$, where the $CO_2$ is from exhaust gases from combustion or other processes in industrial plants. The reaction product is a spent amine containing a carbamate (in the case of primary and secondary amines) or bicarbonate (in the case of tertiary amines).

In both of the above embodiments, as the exhaust gases pass through a $CO_2$ capture absorber ("absorber"), the exhaust gases are in contact with a stream of liquid containing the chemical reagent. The $CO_2$ dissolves in the stream of liquid and chemically reacts with the chemical reagent, removing the desired amount of $CO_2$ from the exhaust gases. Afterwards, the remaining exhaust gases are released to the atmosphere from the plant stack.

Furthermore, a thermal loop recirculates a heat transfer agent through the industrial source producing $CO_2$, absorbing heat from the industrial source, and transferring the heat from the heat transfer agent to liquid effluent (containing carbamate or bicarbonate, depending on the amine used) from the absorber. The absorber includes:

1. Piping, tanks, and pumps to store and transfer spent liquid effluent from the absorber to a stripper
2. Heat exchangers and auxiliary equipment to recover heat
3. A stripper to release $CO_2$ from the spent absorber liquid effluent
4. A condenser and flash unit to remove liquid from the released $CO_2$ gas stream
5. A system of pumps, piping, valves, and related components like fittings and flanges to circulate the heat transfer agent to the combustion or other heat source, and convey the heat transfer agent to the thermal reactor. In one embodiment, the piping is made of steel that is customized to handle temperatures over 1000 F. In another embodiment, the piping is made of steel that is customized to handle temperatures around 750 F.
6. Instrumentation to control, measure, and record process parameters in various areas of the dewatering and regeneration systems; Programmable Logic Controller (PLC), Human Machine Interface (HMI), and Supervisory Control and Data Acquisition (SCADA) devices to automatically control process parameters by using this instrumentation, record performance data, transmit selected data to a cloud-based storage device to allow remote monitoring and troubleshooting; and to enable a dedicated control panel in host industrial plant to allow manual intervention of equipment in the event of a system problem. In another embodiment, the instrumentation to control, measure and record the stripping process can be made through a combination of a processor, memory and data storage.

Examples of Heat Transfer Agents

Example 1: a synthetic organic thermal fluid based on a eutectic mixture of two highly stable compounds (biphenyl ($C_{12}H_{10}$) and diphenyl oxide ($C_{12}H_{10}O$)). The maximum temperature of this heat transfer agent is 750 F. Therefore, this heat transfer agent would be used in a furnace or other industrial heat source where the maximum temperature reached 750 F or less.

Example 2: a fluid based on a eutectic mixture of diphenyl oxide (DPO) and biphenyl. The maximum temperature of this heat transfer agent is 750 F. Therefore, this heat transfer agent would be used in a furnace or other industrial heat source where the maximum temperature reached 750 F or less.

Example 3: a molten salt liquid. The maximum temperature of this heat transfer agent is 1050 F. Therefore, this heat transfer agent would be used in a furnace or other industrial heat source where the maximum temperature reached 1050 F or less.

Example 4: a molten salt fluid. The maximum temperature of this heat transfer agent is 1112 F. Therefore, this heat transfer agent would be used in a furnace or other industrial heat source where the maximum temperature reached 1112 F or less.

These are just 4 examples of heat transfer agents; numerous other heat transfer agents may be used.

Examples of Process Heat Sources

1. Ethylene cracking furnace exhaust gas stack
2. Ethylene cracking furnace radiant zone
3. Ethylene cracking furnace convection zone
4. Ethylene cracking furnace Transfer Line Exchangers
5. Ethylene cracking furnace Quench system
6. Coal-fired boiler bottom ash hopper
7. Coal-fired boiler fly ash hopper 8. Cement kiln furnace area 9. Cement kiln exhaust stack 10. Naphtha (petroleum or non-petroleum) cracking furnace 11. Natural gas combustion furnace This is not intended to represent an exhaustive list of industrial heat sources.

CO2 Absorber Technology

The following is provided to describe the process and equipment immediately before (upstream) of the dewatering and regeneration systems, and is included for clarity.

When the exhaust gases from the combustion or other heat source enters the absorber, it passes through a packing and recirculating reagent (which in this example is NaOH, but could be any suitable alkali in hydroxide form) within the equipment. The overall reactions in the absorber are:

In the first stage, the reaction in the absorber is:

$$CO2+H2O \rightarrow H2CO3$$

In the second stage the reaction in the absorber is:

$$H2CO3+NaOH \rightarrow Na^++HCO3^-+H2O$$

In the third stage, the reaction in the absorber is:

$$HCO3^-+NaOH \rightarrow Na^+{}^{CO}3^=+H2O$$

The CO2 in the exhaust gases first reacts with the water in the chemical reagent to form carbonic acid (H2CO3), which then reacts with NaOH (contained in and added from dedicated tanks) to form a mixture of sodium bicarbonate (NaHCO3) and sodium carbonate (Na2CO3). The carbonate and bicarbonate are in equilibrium depending on the pH of the chemical reagent, and these reactions are reversible. By careful control of pH by the PLC, this equilibrium will be shifted such that it results in the formation of sodium bicarbonate to ensure there is no off-gassing of CO2 in the absorber. The chemical reagent is then returned to the recirculation tank.

A small portion of the recirculating reagent must be removed from the absorber to prevent buildup of carbonate and bicarbonate. This removal activity is referred to as the blow down, and afterwards effluent is conveyed to the dewatering and regeneration systems (in that order).

Dewatering System

In order to efficiently complete the regeneration described later in this application, as much water as possible must first be removed from the effluent, as an appreciable portion of regenerator heat would otherwise be used to evaporate the water before initiating the decomposition reactions. The equipment used for this dewatering typically includes (but is not limited to) clarifiers, vacuum filters, centrifuges, and hydroclones. Between 50% to 75% of the water is removed and returned to the absorber loop. It should be noted that the dewatering is intended to increase the proportion of bicarbonate (which is much less soluble than carbonate and precipitates as a solid more readily) in the dewatered effluent sent to the regeneration systems.

Reagent Regeneration for Metal Oxide Reagents

There are multiple options for regeneration of NaOH from Na2CO3 and NaHCO3 formed in the absorber. The processes to accomplish this are the result of extensive testing. In both cases, the regeneration process may be conducted within the industrial plant producing the CO2 to be captured. Because of the relatively high cost of NaOH, it is likely that some plant owners will opt for regeneration to reduce their operating costs. This application addresses the use of a sealed, non-contact thermal loop to recover heat from the industrial source and use that heat to complete the reactions described below.

Regeneration from Na2CO3 & NaHCO3

The method for regenerating NaOH from Na2CO3 and NaHCO3 is described below:

NaHCO3 is thermally decomposed to Na2CO3, and then the Na2CO3 is thermally decomposed to form solid sodium oxide (Na2O). The reactions (in order) are:

$$2NaHCO3 \rightarrow Na2CO3+H2O+CO2$$

$$Na2CO3 \rightarrow Na2O+CO2$$

The CO2 is in the form of a gas, and is collected and compressed for storage in low pressure tanks. It is later sold for the manufacture of various chemicals, including biofuels, or for use in carbonated beverages and industrial scale greenhouses.

The Na2O is a solid, which is collected and hydrated to produce NaOH, which is returned for use in the absorber. The reaction is:

$$Na2O+H2O \rightarrow 2NaOH$$

The reaction produces NaOH, which is returned for use in the absorber.

In another embodiment of the invention, the initial effluent is a sodium carbonate and sodium bicarbonate mixture. It should be noted that the dewatering is intended to both remove water (in order that heat in the regeneration system is not wasted in evaporating water) and increase the proportion of bicarbonate (which is much less soluble than carbonate and precipitates as a solid more readily) in the dewatered effluent sent to the regeneration systems.

A heat transfer agent is initially at a low temperature and sent to an industrial heat source, where the heat transfer agent increases in temperature, and then returns to the regeneration system at a high temperature. The heat from the heat transfer agent allows for decomposition reactions in the dewatered effluent fed to the regeneration system. In order, the bicarbonate is decomposed to carbonate, which is then decomposed to sodium oxide and CO2 using heat from the heat transfer agent. The sodium oxide is a solid, which is collected and hydrated with water. This produces sodium hydroxide. The sodium hydroxide then returns to the absorber. In this continuous process, the heat transfer agent has recirculated through the heat source, and returns at a high temperature, and is ready to provide heat to cause another sequence of decomposition reactions in the effluent, in order to produce more CO2 as well as regenerate more effluent.

CO2 Absorber Technology (for Amines)

The following is provided to describe the process and equipment immediately before (upstream) of the amine stripper system, and is included for clarity.

When the exhaust gases from the combustion or other heat source enters the absorber, it passes through a packing and recirculating reagent (which in this example is an amine) within the equipment.

In the absorber, the reaction of the amine with CO2 forms a carbamate (in the case of primary and secondary amines) or bicarbonate (in the case of tertiary amines).

A small portion of the recirculating reagent must be removed from the absorber to prevent buildup of carbamate or bicarbonate. This removal activity of spent amine is referred to as the blow down, and afterwards the effluent is conveyed to the stripper for regeneration of the amine.

Stripper System

Reagent Regeneration for Amine Reagents

The regeneration stripping process may be conducted within the industrial plant producing the CO2 to be captured.

Because of the relatively high cost of amines, it is likely that some plant owners will opt for regeneration to reduce their operating costs. This application addresses the use of a sealed, non-contact thermal loop to recover heat from the industrial source and use that heat to complete the regeneration of the spent amine described below.

Regeneration from Amine

Amine regeneration in the stripper off gasses CO2 and produces fresh amine, which is returned for use in the absorber. The CO2 is in the form of a gas, and is collected and compressed for storage in low pressure tanks. It is later sold for the manufacture of various chemicals, including biofuels, or for use in carbonated beverages and industrial scale greenhouses.

In another embodiment of the invention, the initial spent amine effluent from the absorber is a soluble carbonate salt. A heat transfer agent is initially at a low temperature and sent to an industrial heat source, where the heat transfer agent absorbs heat and increases in temperature, and then returns to the stripper and thermal reactor at a significantly higher temperature. The heat from the heat transfer agent allows for stripping of the CO2 from the spent amine. This results in the formation of fresh amine, which then returns to the absorber. In this continuous process, the heat transfer agent has recirculated through the heat source, returns at a high temperature to the stripper and thermal reactor, and is ready to provide heat to produce more CO2 as well as regenerate more spent amine effluent.

Another embodiment of the invention is a method to reclaim CO2 absorption reagent from spent absorber effluent from a carbon dioxide capture process using waste heat from a source producing carbon dioxide, comprising: a dewatering system, including any combination of clarifiers, vacuum filters, hydroclones, and centrifuges, to remove and re-use water from the spent absorber effluent; a system of pumps and piping to convey the dewatered slurry to a thermal reactor; a thermal reactor with a system of pumps, piping, and process controls; a system of equipment including a condenser, coolant pumps and piping connected to the condenser, and a compressor to pressurize and convey the CO2 off gas produced in the thermal reactor to a system of CO2 storage vessels; wherein a heat transfer agent circulates through the piping between the thermal reactor and the waste heat source to provide heat that causes a reaction in the thermal reactor to form a solid product; and wherein a hydration system causes a reaction between solid product from the thermal reactor and water to produce reclaimed sorbent used as the CO2 absorbent reagent in a CO2 absorber ("absorber").

The sorbent can be either a metal hydroxide or an organic reagent. Some examples of metal hydroxides are sodium hydroxide and potassium hydroxide. One example of an organic reagent is an amine. The method can also include a storage system for the reclaim sorbent for re-use in the absorber. The heat transfer agent can be a molten salt.

The solid product can be sodium carbonate, in which case the reclaimed sorbent is sodium hydroxide. Alternatively, the solid product can be potassium carbonate, in which case the reclaimed sorbent is potassium hydroxide. In general, any carbonate that is the solid product, results in reclaimed sorbent that is a hydroxide.

Another embodiment of the invention is an apparatus to reclaim CO2 absorption reagent from spent absorber effluent from a carbon dioxide capture process using waste heat from a source producing carbon dioxide, comprising: a sorbent that is a metal hydroxide; a system of pumps and piping to convey the dewatered slurry to a thermal reactor; a thermal reactor with a system of pumps, piping, and process controls; a system of equipment including a condenser, coolant pumps and piping connected to the condenser, and a compressor to pressurize and convey the CO2 off gas produced in the thermal reactor to a system of CO2 storage vessels; wherein a hydration system causes a reaction between solid product from the thermal reactor and water to produce reclaimed metal hydroxide used as the CO2 absorbing reagent (sorbent) in a CO2 absorber ("absorber").

The apparatus can also include a storage system for the reclaimed sorbent for re-use in the absorber. Some examples of metal hydroxides that can be used as sorbents are sodium hydroxide, potassium hydroxide and lithium hydroxide. Similarly, some possible reclaimed metal hydroxides are sodium hydroxide, potassium hydroxide and lithium hydroxide.

Another embodiment of the invention is an apparatus to reclaim CO2 absorption reagent from a spent absorber effluent from a carbon dioxide capture process using waste heat from a source producing carbon dioxide, comprising: a sorbent that is an organic reagent; a system of pumps and piping to convey the absorber effluent to a thermal reactor; a thermal reactor with a system of pumps, piping, and process controls; A system of equipment including a condenser, coolant pumps and piping connected to the condenser, and a compressor to pressurize and convey the CO2 off gas produced in the thermal reactor or stripper to a system of CO2 storage vessels; wherein a stripper system uses the heat from the heat transfer agent to strip the CO2 from the to produce reclaimed amine used as the CO2 sorbent.

The reclaimed sorbent can be a primary or secondary amine. The apparatus can also include a stripper system, incorporating a stripping column, heat exchangers to recover heat from the stripper effluent (the regenerated amine) for preheating the stripper feed stream, pumps, piping, process controls, and related equipment.

Another embodiment of the invention is an apparatus to reclaim CO2 absorption reagent from a spent absorber effluent from a carbon dioxide capture process using waste heat from a source producing carbon dioxide, comprising: a sorbent that is an organic reagent; a system of pumps and piping to convey the absorber effluent to a stripper; a stripper with a system of pumps, piping, and process controls; a system of equipment including a condenser, coolant pumps and piping connected to the condenser, and a compressor to pressurize and convey the CO2 off gas produced in the thermal reactor or stripper to a system of CO2 storage vessels; wherein a stripper system uses the heat from the heat transfer agent to strip the CO2 from the to produce reclaimed amine used as the CO2 sorbent.

The reclaimed sorbent can be a tertiary amine. The apparatus can also include a stripper system, incorporating a stripping column, heat exchangers to recover heat from the stripper effluent (the regenerated amine) for preheating the stripper feed stream, pumps, piping, process controls, and related equipment.

FIG. 1

In the embodiment of the invention shown in FIG. 1, there is a CO2 absorption process used to capture CO2 from the exhaust gases, and the regeneration process used to produce sorbent. A process heat source produces heat and gives off CO2 and exhaust gases. The incoming cold heat transfer agent absorbs some of the heat and exhaust gases, and the outgoing is hot heat transfer agent. Some of the heat from the process heat source is normally lost as waste heat, much of which is now captured by the heat transfer agent. The hot heat transfer agent goes through the thermal reactor, where NaHCO3 (or KHCO3) is decomposed to Na2CO3 (or K2CO3), which Na2CO3 (or K2CO3) is then decomposed to Na2O (or K2O) by the heat from the heat transfer agent. Water is then added to the Na2O (or K2O) to produce fresh NaOH (or KOH). Also, some CO2 is released, captured, and condensed.

FIG. 2

Figure 2:
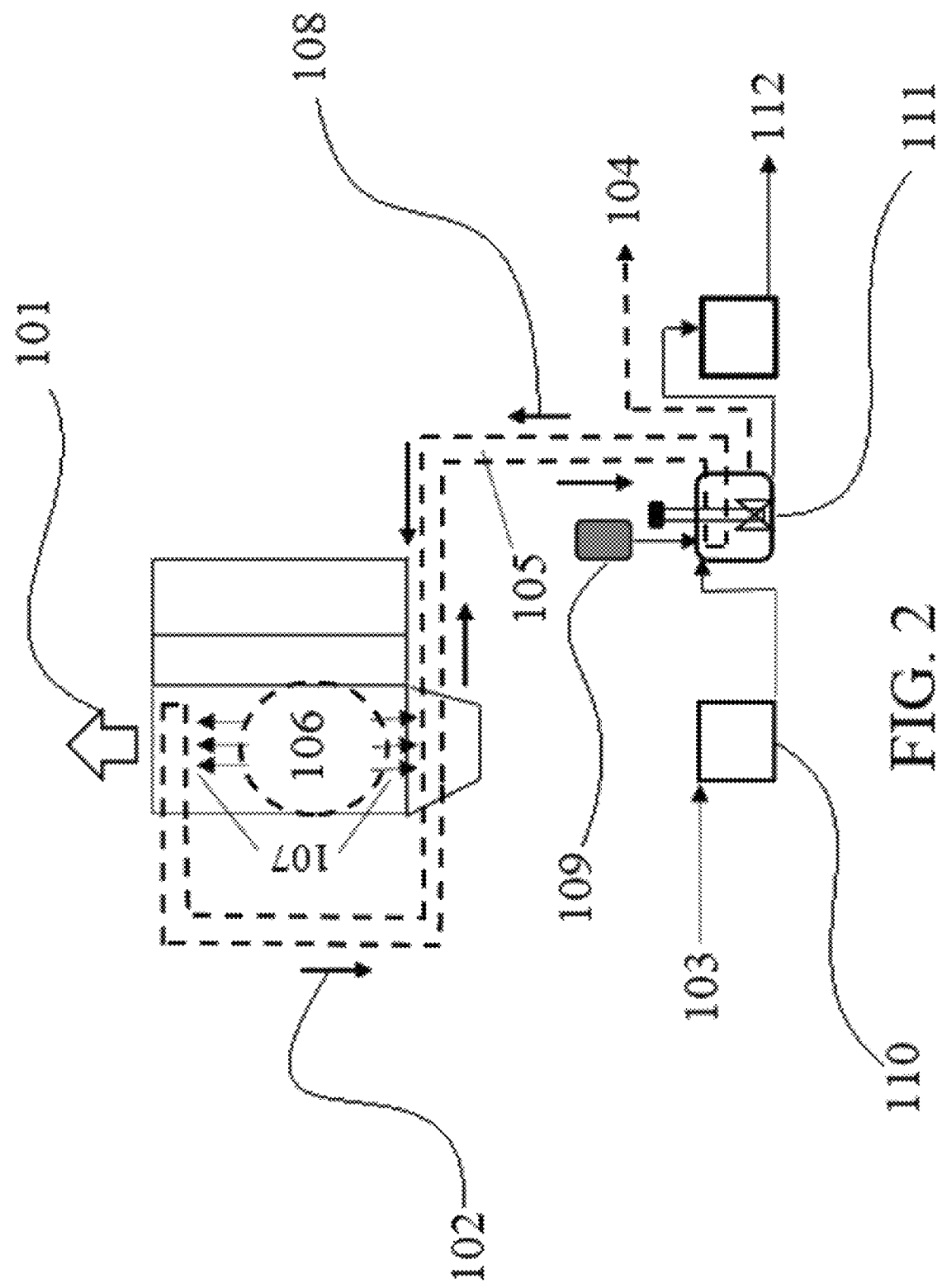
FIG. 2 is a drawing of a $CO_2$ absorption process used to capture $CO_2$ from the exhaust gases, and the regeneration process used to produce sorbent, according to various embodiments of the present disclosure.

In the embodiment of the invention shown in FIG. 2, there is a CO2 absorption process used to capture CO2 from the exhaust gases, and the regeneration process used to produce sorbent. A non-contact steel thermal loop 105 contains cold heat transfer agent 108 pumped to an industrial heat source 106, and contains hot heat transfer agent 102 pumped from the industrial heat source 106. The industrial heat source 106 also releases waste heat 107 to the cold heat transfer agent 108, which heats the cold heat transfer agent 108 such that it becomes hot heat transfer agent 102. The hot heat transfer agent 102 goes to the thermal reactor 111, where the hot heat transfer agent 102 releases heat that is used to create decomposition reactions. Water 109 is fed into the thermal reactor 111 to complete the last phase (hydration) of the reaction. Initial effluent 103 is pumped to a feed tank 110. The initial effluent 103 from absorber 601 can be a mixture of sodium carbonate and sodium bicarbonate. The initial effluent 103 is then fed into the thermal reactor 111 in order to implement the reactions. The reactions result in the creation of reclaimed sorbent 112. The reclaimed sorbent 112 is returned to the absorber 601 in the absorption process.

The thermal reactor 111 also releases carbon dioxide 104, which is sent to a condenser and compressor, so that the carbon dioxide 104 can be condensed and compressed, and then sold at a later date.

FIG. 3

Figure 3:
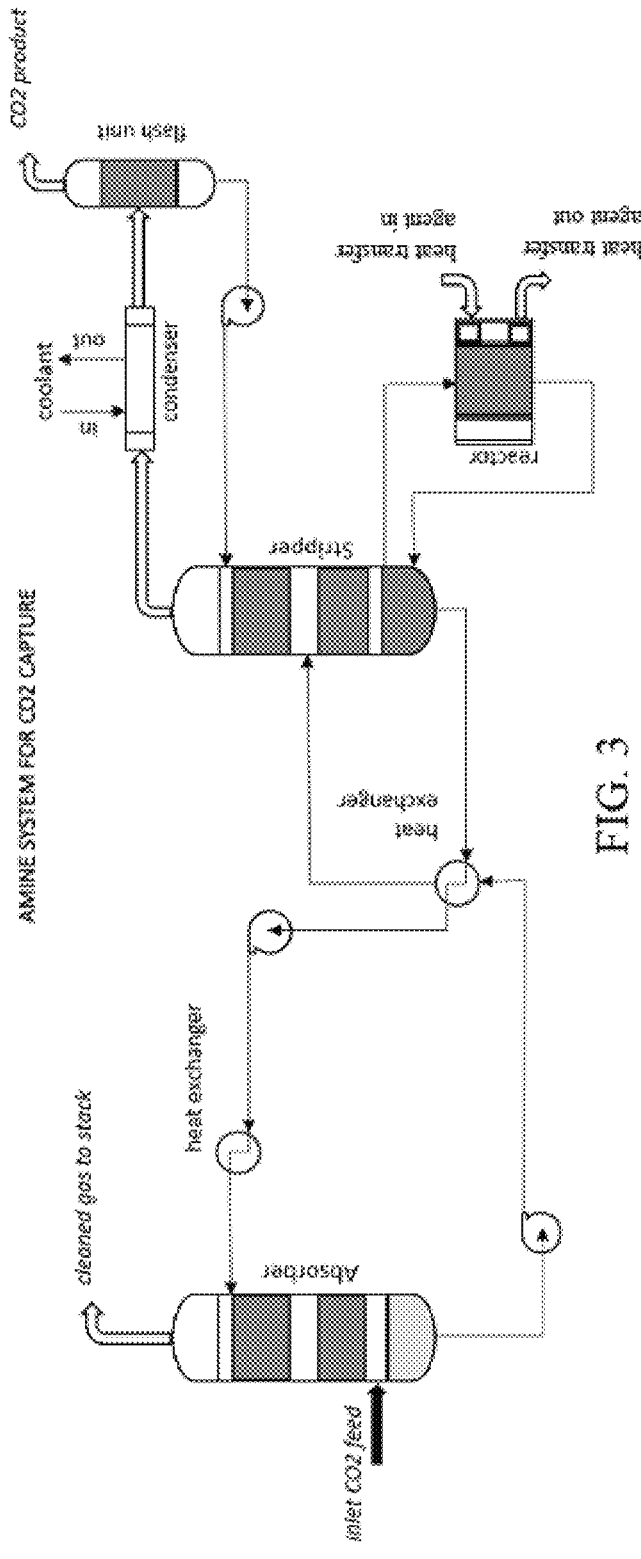
FIG. 3 is a drawing of a $CO_2$ absorption process used to capture $CO_2$ from the exhaust gases, and the regeneration process used to produce sorbent, according to various embodiments of the present disclosure.

In the embodiment of the invention shown in FIG. 3, there is a CO2 absorption process used to capture CO2 from the exhaust gases, and the regeneration process used to produce sorbent.

FIG. 4 and FIG. 8

Figure 4:
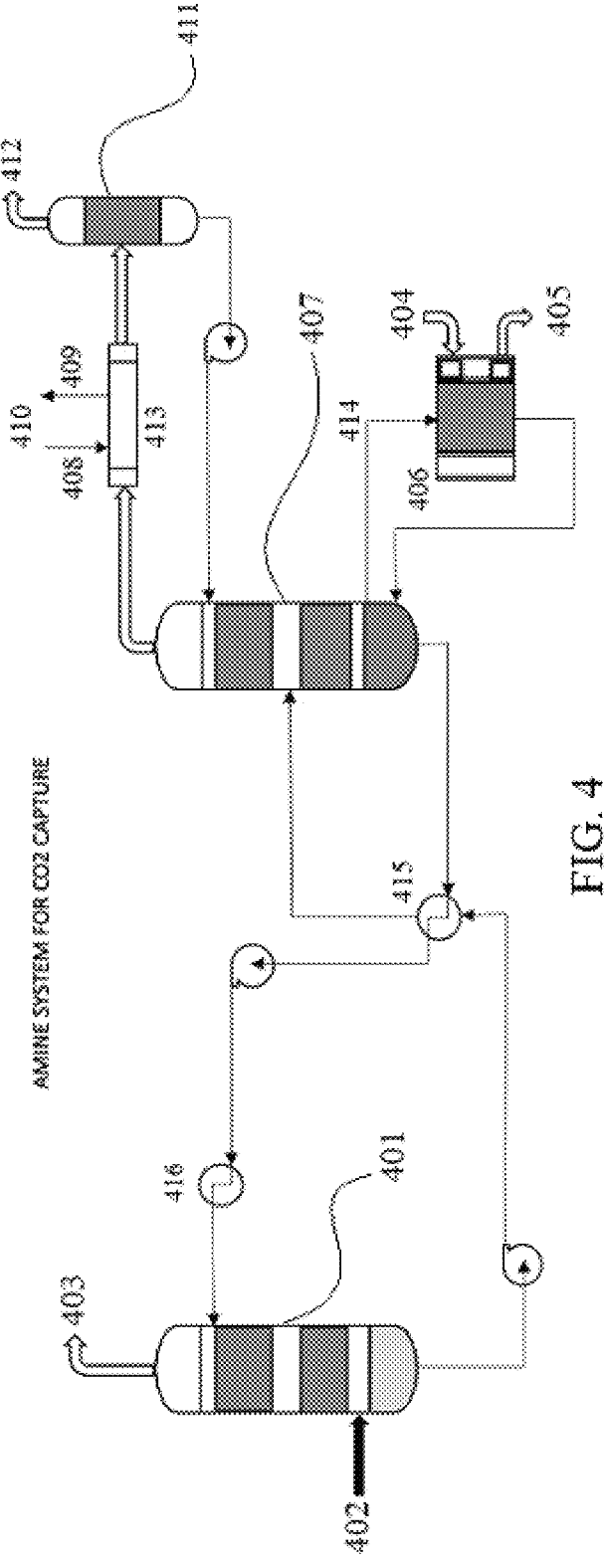
FIG. 4 is a drawing of a $CO_2$ absorption process used to capture $CO_2$ from the exhaust gases, and the regeneration process used to produce sorbent, according to various embodiments of the present disclosure.
Figure 8:
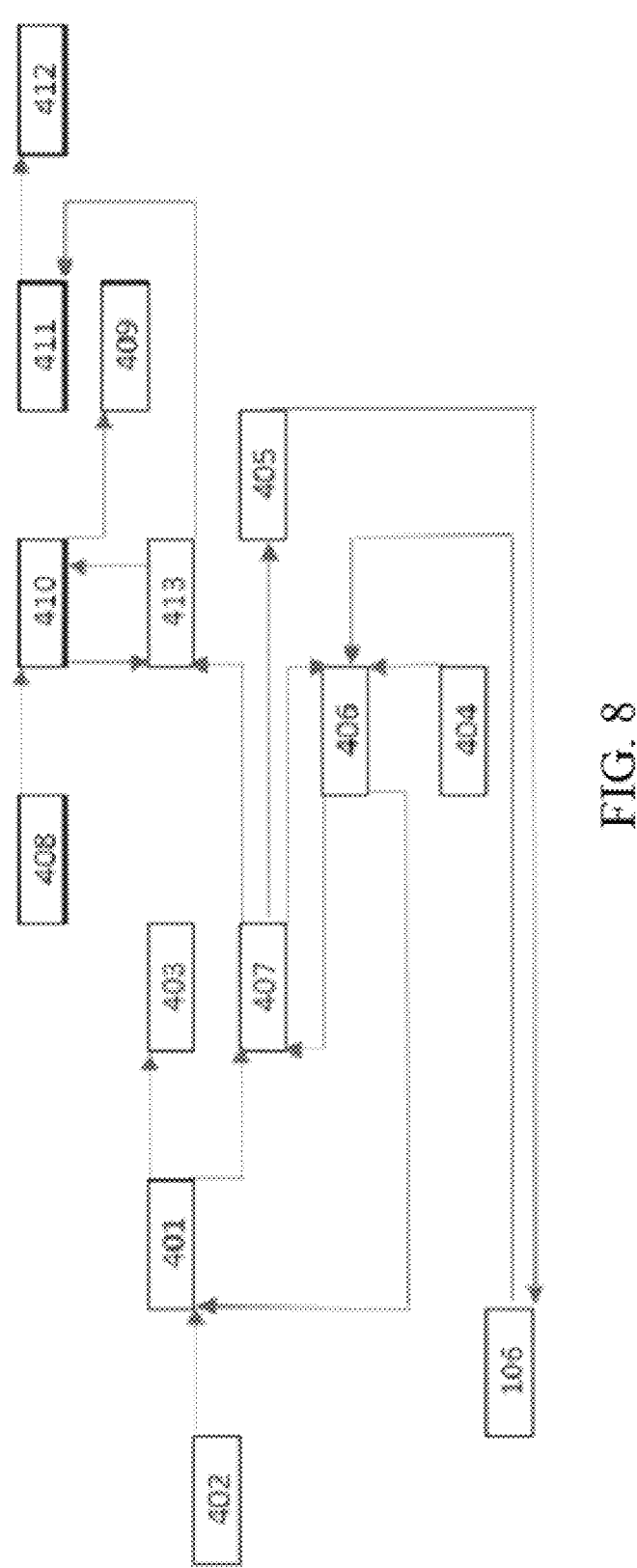
FIG. 8 is a drawing of a $CO_2$ absorption process used to capture $CO_2$ from the exhaust gases, and the regeneration process used to produce sorbent, according to various embodiments of the present disclosure.
Figure 9:
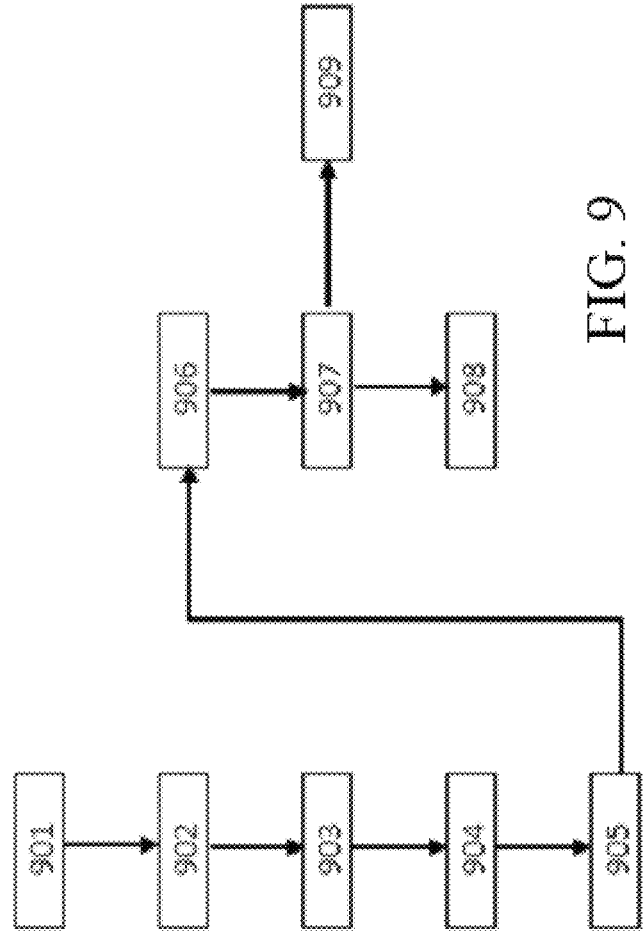
FIG. 9 is a drawing of a $CO_2$ absorption process used to capture $CO_2$ from the exhaust gases, and the regeneration process used to produce sorbent, according to various embodiments of the present disclosure.
Figure 10:
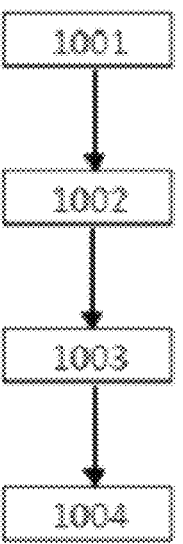
FIG. 10 is a drawing of a $CO_2$ absorption process used to capture $CO_2$ from the exhaust gases, and the regeneration process used to produce sorbent, according to various embodiments of the present disclosure.
Figure 11:
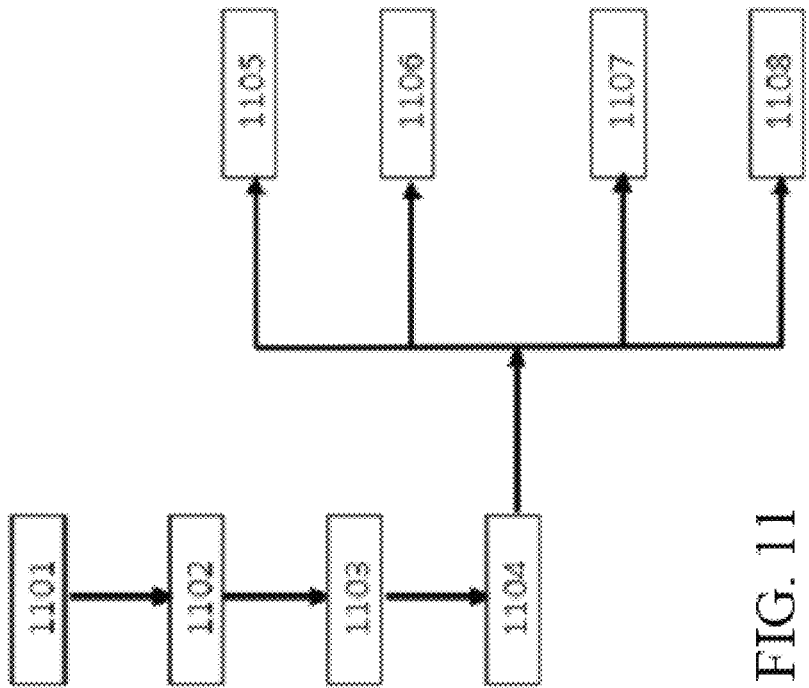
FIG. 11 is a drawing of a $CO_2$ absorption process used to capture $CO_2$ from the exhaust gases, and the regeneration process used to produce sorbent, according to various embodiments of the present disclosure.

In the embodiment of the invention shown in FIG. 4 and FIG. 8, there is a CO2 absorption process used to capture CO2 from the exhaust gases, and the regeneration process used to produce sorbent. Reclaimed amine sorbent is sent to an absorber 401. The inlet CO2 feed 402 brings CO2 into the absorber 401. Cleaned gas 403 which now has reduced CO2 content is sent out of the absorber 401 to a stack. A system of pumps and piping to convey liquid effluent from the absorber 401 to a stripper 407; a stripper 407 with a system of pumps, piping, and process controls; a system of equipment including a condenser 413, coolant pumps 410, coolant inlet piping 408 and outlet piping 409 connected to the condenser, a flash unit 411 to separate CO2 gas from liquid, and a compressor to pressurize and convey the CO2 off gas 412 produced in the stripper to a system of CO2 storage vessels; wherein a stripper system uses the heat from the hot heat transfer agent 404 to strip the CO2 from the stripper liquid recirculating between the stripper 407 and the thermal reactor 406 to produce reclaimed amine (used as the CO2 sorbent) which is returned to the absorber 401.

The cooled heat transfer agent 405 is now returned from the thermal reactor to the industrial heat source 106 to increase its temperature before returning to the thermal reactor 406. Because the heat transfer agent is recirculating between the thermal reactor 406 and the industrial heat source 106 in a sealed loop, there is no contact between the heat transfer agent and the amine in the thermal reactor or any other equipment. Furthermore, there is also a heat exchanger 415 to preheat the effluent entering the stripper and a heat exchanger 416 if required for additional cooling of regenerated amine entering the absorber 401.

The reclaimed sorbent can be an amine. The apparatus can also include a stripper system, incorporating a stripping column; heat exchangers to recover heat from the regenerated amine being returned to the absorber 401 after preheating the stripper feed stream, pumps, piping, process controls, and related equipment.

FIG. 5

Figure 5:
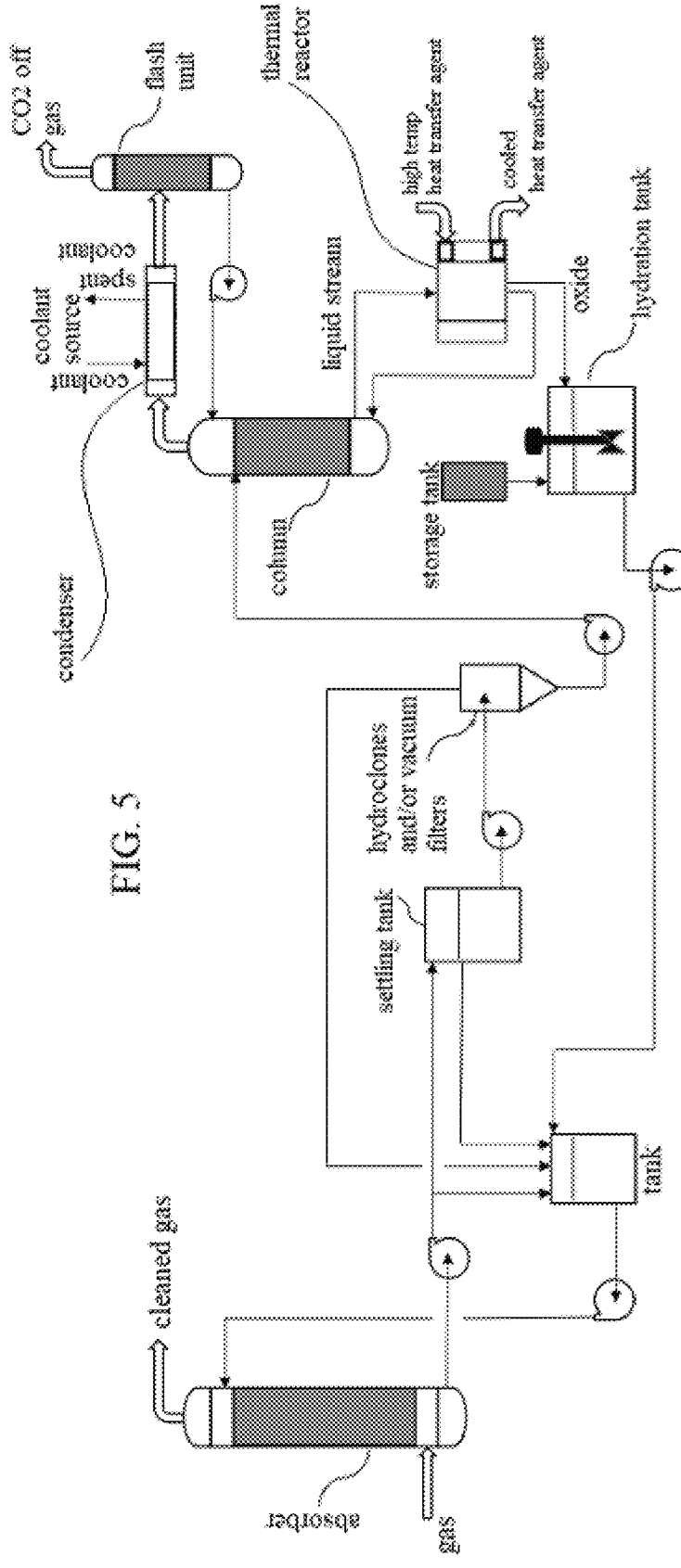
FIG. 5 is a drawing of a $CO_2$ absorption process used to capture $CO_2$ from the exhaust gases, and the regeneration process used to produce sorbent, according to various embodiments of the present disclosure.

In the embodiment of the invention shown in FIG. 5, there is a CO2 absorption process used to capture CO2 from the exhaust gases, and the regeneration process used to produce sorbent.

FIG. 6

Figure 6:
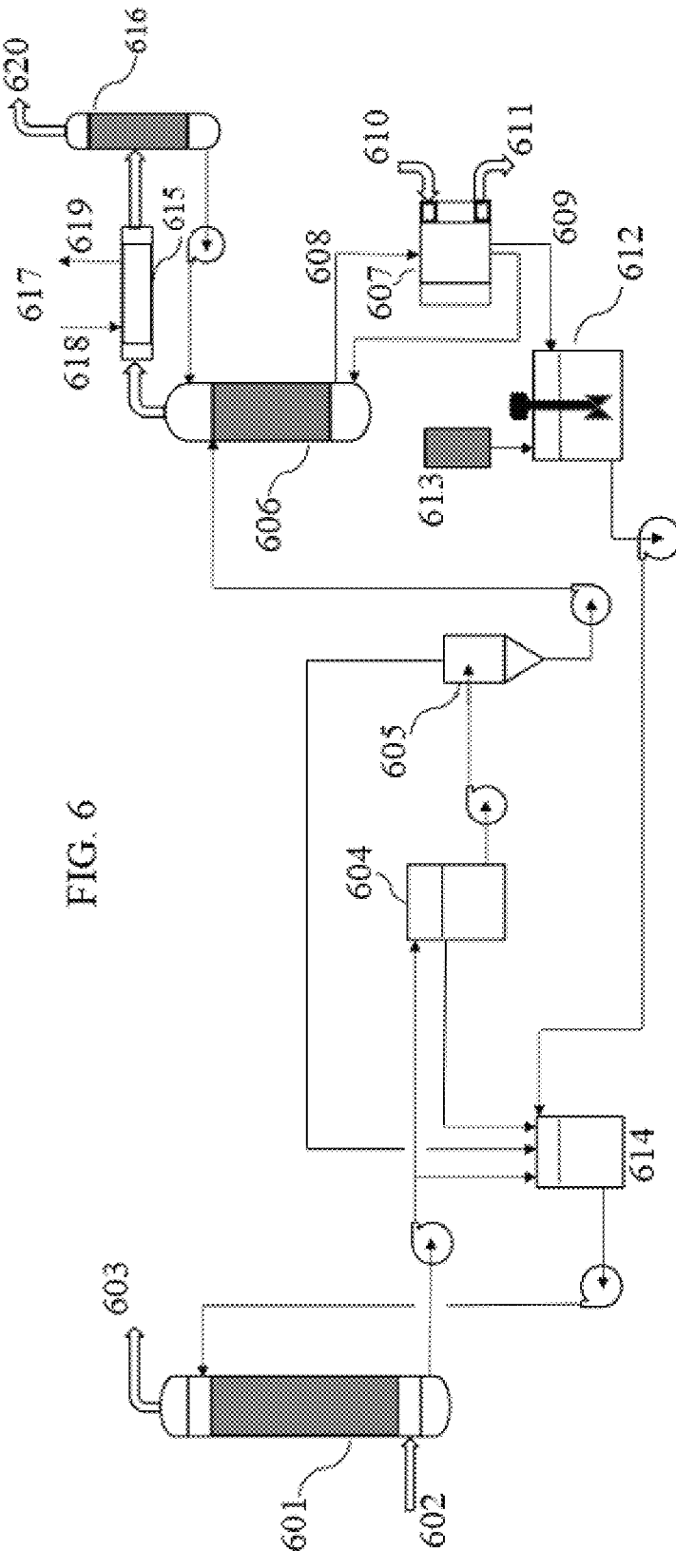
FIG. 6 is a drawing of a $CO_2$ absorption process used to capture $CO_2$ from the exhaust gases, and the regeneration process used to produce sorbent, according to various embodiments of the present disclosure.
Figure 7:
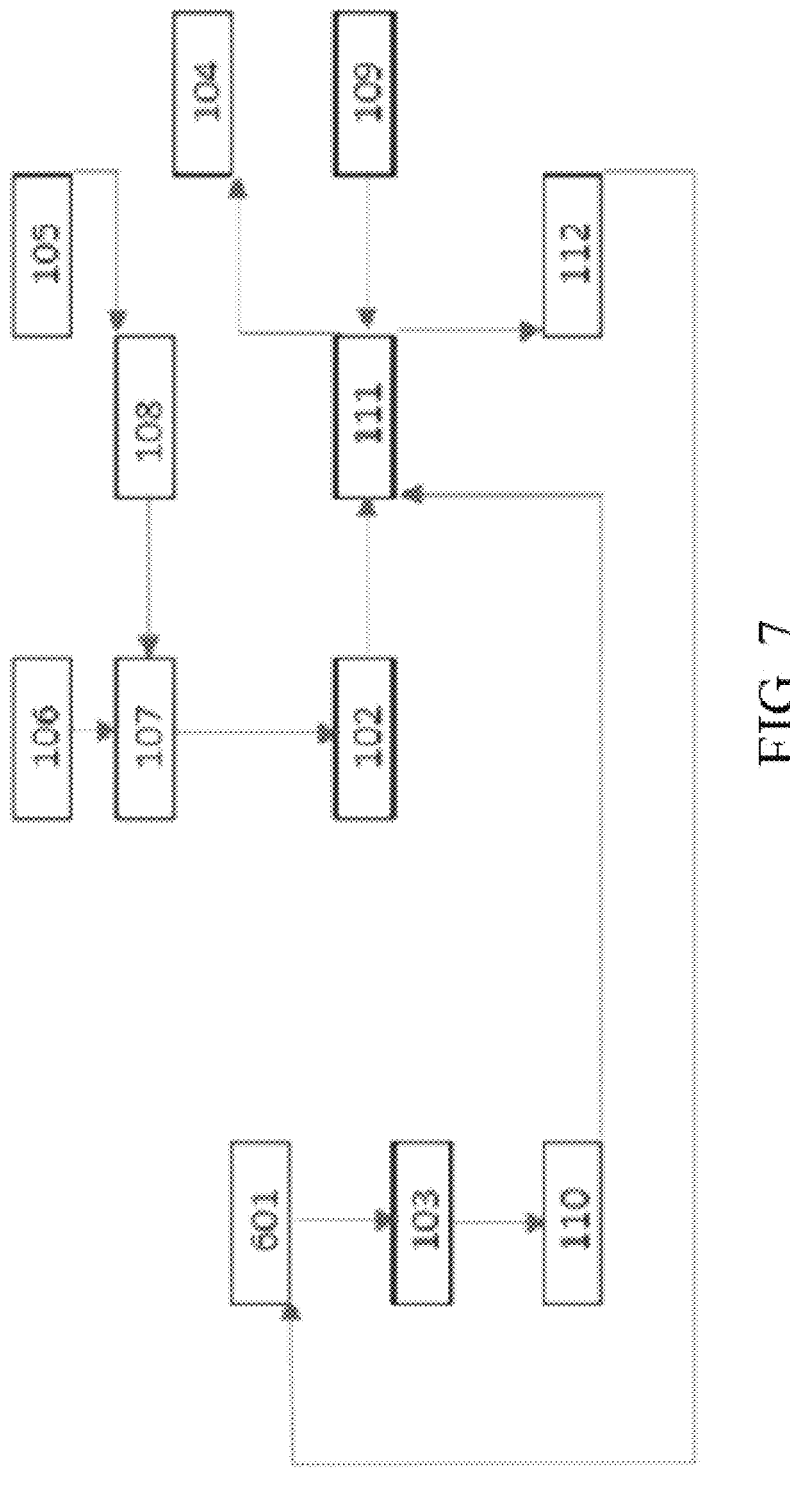
FIG. 7 is a drawing of a $CO_2$ absorption process used to capture $CO_2$ from the exhaust gases, and the regeneration process used to produce sorbent, according to various embodiments of the present disclosure.

In the embodiment of the invention shown in FIG. 6, there is a CO2 absorption process used to capture CO2 from the exhaust gases, and the regeneration process used to produce sorbent.

Reclaimed sorbent is pumped to tank 614, which pumps the sorbent to the top of absorber 601. The CO2 in the gas 602 entering the absorber is captured by the sorbent in the absorber, and the cleaned gas 603 which now has reduced CO2 content is exhausted from the top of absorber 601. A portion of the liquid effluent from the absorber is pumped to settling tank 604, where the solids continue a dewatering process of settling to the bottom of settling tank 604. The settled solids are pumped to hydroclones and/or vacuum filters 605 for additional dewatering. The overflow (if using hydroclones) or filtrate (if using vacuum filters) from hydroclones and/or vacuum filters 605 is returned to tank 614. The dewatered solid stream from hydroclones and/or vacuum filters 605 is pumped to column 606, where CO2 is released from the entering stream. This CO2 release is caused by recirculating the liquid stream 608 between the column 606 and the thermal reactor 607. The high temperature heat transfer agent 610 returning from the heat source provides the heat required in column 606 for release of the CO2. The now cooled heat transfer agent 611 returns to the heat source to recover more heat. Decomposition of the bicarbonate solids (to carbonate) from the hydroclones and/or vacuum filters 605 entering the column 606 simultaneously occurs during the release of CO2, followed by decomposition of the carbonate solids in the thermal reactor to the oxide 609, which is discharged to the hydration tank 612. Water for hydration is pumped from storage tank 613 to hydration tank 612, and reacts with the oxide to form the hydroxide. This reclaimed hydroxide is pumped to the absorber recirculation tank 614, which feeds the sorbent to the top of absorber 601 to capture CO2 entering in stream 602. The CO2 gas, containing some water vapor, is fed to condenser 615. Coolant 618 from a coolant source 617 enters the condenser 615 and condenses water from the gas. The spent coolant 619 leaves the condenser 615 and returns to the coolant source. The exhaust gases coming out of the condenser 615 are fed to a flash unit 616, to separate CO2 gas from liquid, and a compressor to pressurize and convey the CO2 off gas 620 produced in the stripper to a system of CO2 storage vessels.

FIG. 7

In another embodiment of the invention, industrial heat source 106 releases waste heat 107, which creates hot heat transfer agent 102. The hot heat transfer agent 102 is sent to the thermal reactor 111, non-contact steel thermal loop 105, the cold heat transfer agent 108. The absorber 601 pumps initial effluent 103 to a feed tank 110. The initial effluent 103 is sent from the feed tank 110 to the thermal reactor 111. The thermal reactor 111 discharges reclaimed sorbent 112, which is pumped to the absorber 601, where the cycle starts again. Water 109 is added to the thermal reactor 111. The thermal reactor 111 discharges carbon dioxide 104, which is compressed and stored for future use and sale.

FIG. 9

In another embodiment of the invention, the invention is a method to reclaim CO2 absorption reagent from spent absorber effluent from a carbon dioxide capture process using waste heat from a source producing carbon dioxide, comprising: a dewatering system, including any combination of clarifiers, vacuum filters, hydroclones, and centrifuges, to remove and re-use water from the spent absorber effluent; a system of pumps and piping to convey dewatered slurry to a thermal reactor; a thermal reactor with a system of pumps, piping, and process controls; a system of equipment including a condenser, coolant pumps and piping connected to the condenser, and a compressor to pressurize and convey CO2 off gas produced in the thermal reactor to a system of CO2 storage vessels. In step 901, a heat transfer agent circulates through the piping between the thermal reactor and a waste heat source. In step 902, the heat transfer agent absorbs the waste heat from the source producing CO2. In step 903, the heat transfer agent provides heat that causes a reaction in the thermal reactor to form a solid bicarbonate product. In step 904, decomposition of bicarbonate to solid carbonate occurs in the thermal reactor. In step 905, decomposition of the solid carbonate to a solid oxide occurs. In step 906, a hydration system causes a reaction between solid oxide product from the thermal reactor and water to produce reclaimed sorbent. In step 907, the reclaimed sorbent is used as the CO2 absorption reagent in an absorber.

The reclaimed sorbent might be a metal hydroxide. The metal hydroxide might be either sodium hydroxide, or potassium hydroxide, or lithium hydroxide. The metal hydroxide might also be any another metal hydroxide.

The heat transfer agent can be a molten salt. Alternatively, the heat transfer agent can be glycols.

In one alternative, the solid carbonate can be sodium carbonate, in which case the reclaimed sorbent is sodium hydroxide. In another alternative, the solid carbonate can be potassium carbonate, in which case the reclaimed sorbent is potassium hydroxide. In another alternative, the solid carbonate can be lithium carbonate, in which case the reclaimed sorbent is lithium hydroxide.

In an optional alternative step 908, the reclaimed sorbent is sent to a storage system so that the reclaimed sorbent can be reused in the absorber. In another optional alternative step 909, the reclaimed sorbent is a metal hydroxide, the heat transfer agent is a molten salt, and the reclaimed sorbent is sent to a storage system so that the reclaimed sorbent can be reused in the absorber.

FIG. 10

In another embodiment of the invention, the invention is an apparatus to reclaim CO2 absorption reagent from spent absorber effluent from a carbon dioxide capture process using waste heat from a source producing carbon dioxide, comprising: a sorbent that is a metal hydroxide; a dewatering system, including any combination of clarifiers, vacuum filters, hydroclones, and centrifuges, to remove and re-use water from the spent absorber effluent; a system of pumps and piping to convey dewatered slurry to a thermal reactor; a thermal reactor with a system of pumps, piping, and process controls; a system of equipment including a condenser, coolant pumps and piping connected to the condenser, and a compressor to pressurize and convey CO2 off gas produced in the thermal reactor to a system of CO2 storage vessels. In step 1001, a hydration system causes a reaction between solid product from the thermal reactor and water. In step 1002, this reaction produces reclaimed metal hydroxide. In step 1003, this reclaimed metal hydroxide is used as reclaimed CO2-absorbing sorbent in an absorber.

In an optional alternative step 1004, the reclaimed CO2-absorbing sorbent is sent to a storage system so that the reclaimed sorbent can be reused in the absorber.

The reclaimed metal hydroxide might be either sodium hydroxide, or potassium hydroxide, or lithium hydroxide. The metal hydroxide might also be any another metal hydroxide.

FIG. 11

In another embodiment of the invention, the invention is an apparatus to reclaim CO2 absorption reagent from spent absorber effluent from a carbon dioxide capture process using waste heat from a source producing carbon dioxide, comprising: a sorbent that is an organic reagent; a system of pumps and piping to convey the spent absorber effluent to a thermal reactor and stripper; the thermal reactor and stripper with a system of pumps, piping, and process controls; a system of equipment including a condenser, coolant pumps and piping connected to the condenser, a flash unit, and a compressor to pressurize and convey CO2 off gas produced in the thermal reactor or stripper to a system of CO2 storage vessels. In step 1101, a heat transfer agent absorbs the waste heat from the source producing carbon dioxide. In step 1102, a stripper system uses heat from the heat transfer agent to strip CO2 from exhaust gases. In step 1103, the stripper system produces reclaimed amine. In step 1104, the reclaimed amine is then used as the sorbent.

The reclaimed amine can be either a primary, secondary, or tertiary amine. In an alternative optional step 1105, when the reclaimed amine is a primary amine, the apparatus produces carbamate as a result of CO2 combining with the reclaimed amine. In an alternative optional step 1106, when the reclaimed amine is a secondary amine, the apparatus produces carbamate as a result of CO2 combining with the reclaimed amine. In an alternative optional step 1107, when the reclaimed amine is a tertiary amine, the apparatus produces bicarbonate as a result of CO2 combining with the reclaimed amine.

In an alternative optional step 1108, the apparatus includes a stripper system incorporating a stripping column and heat exchangers. The heat exchangers recover heat from the spent absorber effluent (the regenerated amine). The heat exchangers use the recovered heat in order to preheat a stripper feed stream, pumps, piping, process controls, and related equipment.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed:

1. An apparatus to reclaim CO2 absorption reagent from spent absorber effluent from a carbon dioxide capture process using waste heat from a source producing carbon dioxide, comprising: a sorbent that is a metal hydroxide; a dewatering system, including any combination of clarifiers, vacuum filters, hydrocyclones, and centrifuges, to remove and re-use water from the spent absorber effluent; a system of pumps and piping to convey dewatered slurry to a thermal reactor; the thermal reactor with a system of pumps, piping, and process controls; a system of equipment including a condenser, coolant pumps and piping connected to the condenser, and a compressor to pressurize and convey CO2 off gas produced in the thermal reactor to a system of CO2 storage vessels; and wherein a hydration system causes a reaction between solid product from the thermal reactor and water to produce reclaimed metal hydroxide used as reclaimed CO2-absorbing sorbent in an absorber.

2. The apparatus of claim 1, further comprising a storage system for the reclaimed CO2-absorbing sorbent for re-use in the absorber.

3. The apparatus of claim 1, wherein the reclaimed CO2-absorbing sorbent is sodium hydroxide.

4. The apparatus of claim 1, wherein the reclaimed CO2-absorbing sorbent is potassium hydroxide.

5. The apparatus of claim 1, wherein the reclaimed CO2-absorbing sorbent is lithium hydroxide.

* * * * *